US007844004B2

(12) United States Patent
De Rore

(10) Patent No.: US 7,844,004 B2
(45) Date of Patent: Nov. 30, 2010

(54) METHOD FOR ESTIMATING AND COMPENSATING CARRIER FREQUENCY OFFSET

(75) Inventor: Stefaan De Rore, Leefdaal (BE)

(73) Assignees: IMEC, Leuven (BE); Samsung Electronics Co., Ltd., Suwon-si (KR)

( * ) Notice: Subject to any disclaimer, the term of this patent is extended or adjusted under 35 U.S.C. 154(b) by 1033 days.

(21) Appl. No.: 11/607,207

(22) Filed: Dec. 1, 2006

(65) Prior Publication Data

US 2007/0140366 A1    Jun. 21, 2007

(30) Foreign Application Priority Data

Dec. 2, 2005    (EP)    ................. 05111627

(51) Int. Cl.
    *H04L 27/28*    (2006.01)
(52) U.S. Cl. ............... 375/260; 375/259; 375/346; 455/59
(58) Field of Classification Search ............ 375/259, 375/260
    See application file for complete search history.

(56) References Cited

U.S. PATENT DOCUMENTS

| 7,158,558 | B2 | 1/2007 | Petre et al. | |
| 2005/0152476 | A1* | 7/2005 | Coersmeier | 375/322 |
| 2005/0152482 | A1* | 7/2005 | Tubbax et al. | 375/346 |
| 2005/0276354 | A1* | 12/2005 | Su et al. | 375/326 |
| 2006/0029150 | A1* | 2/2006 | Capozio | 375/269 |

FOREIGN PATENT DOCUMENTS

| EP | 1 357 693 A1 | 10/2003 |
| EP | 1 722 500 A1 | 11/2006 |
| WO | WO03/101064 A1 | 12/2003 |

OTHER PUBLICATIONS

European Search Report for Application No. 05111627.5, May 2, 2006.
Fouladifard et al., "A New Technique for Estimation and Compensation of IQ Imbalance in OFDM Receivers," Proc. Of the IEEE 8$^{th}$ International Conference on Communications Systems, vol. 1, pp. 224-228, Nov. 2002.

(Continued)

*Primary Examiner*—Shuwang Liu
*Assistant Examiner*—Kenneth Lam
(74) *Attorney, Agent, or Firm*—Knobbe Martens Olson & Bear LLP

(57) ABSTRACT

One inventive aspect relates to a method of estimating carrier frequency offset introduced on an RF multicarrier signal received via a transmission channel on a direct downconversion analog receiver. The method comprises generating a preamble comprising at least one set of training symbols. The method further comprises transmitting the preamble to the receiver. The method further comprises determining a carrier frequency offset estimate from the received preamble by an estimation method which has a higher precision for a first range of carrier frequency offset values and a lower precision for a second range of carrier frequency offset values. The method further comprises introducing a predetermined artificial carrier frequency offset on at least one set of training symbols, the predetermined artificial carrier frequency offset being chosen for shifting the carrier frequency offset of that set of training symbols to the first range.

16 Claims, 7 Drawing Sheets

OTHER PUBLICATIONS

Ma et al., "Analysis of IQ Imbalance on Initial Frequency Offset Estimation in Direct Down-Conversion Receivers," Wireless Communications, 2001 (SPAWC '01), 2001 IEEE Third Workshop on Signal Processing Advances in Mar. 20-23, 2001, pp. 158-161.

Tarighat et al., "On the Baseband Compensation of IQ Imbalances in OFDM Systems," Proc. (ICASSP '04) Acoustics, Speech and Signal Processing, vol. 4, pp. 1021-1024, May, 2004.

Tubbax et al., "Joint Compensation of IQ Imbalance and Frequency Offset in OFDD Systems," IEEE Global Telecommunications Conference, IEEE, vol. 7 of 7, pp. 2365-2369, Dec. 1, 2003.

Xing et al., "Frequency Offset and I/Q Imbalance Compensation for OFDM Direct-Conversion Receivers," IEEE International Conference on Acoustics, Speech, and Signal Processing Proceedings, IEEE, vol. 1 of 6, pp. IV708-IV711, Apr. 6, 2003.

Yan et al., Carrier Frequency Offset Estimation for OFDM Systems with I/Q Imbalance, Proc. The $47^{th}$ IEEE Midwest Symposium on Circuits and Systems, MWSCAS '04, vol. 2, pp. 633-636, Jul., 2004.

* cited by examiner

Part1: $y_T(t)$ with $t = 1 \cdots (c+n)b$

Part2: $z_T(t) = y_T(t)e^{j2\pi f_a \frac{t}{f_s}}$ with $t = 1 \cdots (c+n)b$

METHOD FOR ESTIMATING AND COMPENSATING CARRIER FREQUENCY OFFSET

BACKGROUND OF THE INVENTION

1. Field of the Invention

The present invention relates to a method for estimating carrier frequency offset introduced on an RF multicarrier signal received via a transmission channel on a direct downconversion analog receiver. The invention further relates to a method for compensating carrier frequency offset.

2. Description of the Related Technology 4G cellular wireless systems candidates like multi-carrier CDMA (MC-CDMA) or multi-carrier block spread CDMA (MCBS-CDMA) or single-carrier CDMA (SC-CDMA, also named cyclic prefix CDMA) and single-carrier block spread (SCBS-CDMA) have a high susceptibility to synchronization errors like carrier frequency offset (CFO) and IQ imbalance. These systems are multi-user systems and suffer from multi-user interference (MUI). The different synchronization errors of individual users all contribute to the total MUI, while the joint linear detectors used to separate the users are not built to remove the MUI caused by synchronization errors. If not properly estimated and compensated synchronization errors like carrier frequency offset (CFO) and IQ-imbalance cause a substantial performance degradation. The susceptibility to CFO is most prominent in the case of a multi-user up-link. Detecting the CFO's from different users in a multi-user up-link is only possible after the users are separated by the joint detector. Therefore the CFO is pre-compensated at each transmitting user terminal. If the CFO was not precisely measured and pre-compensated at the user terminals, the remaining CFO of the different users will cause MUI reducing the effectiveness of the joint detector at the base-station.

CDMA systems, due to the spreading of data, can operate in a wide range of Signal-to-Noise Ratios (SNRs), ranging from 0 dB till 30 dB. To obtain a useful accuracy at 0 dB a long preamble sequence, long in comparison to OFDM WLAN systems, is needed to average out the noise. Long preambles cause overhead, therefore a general strategy is adopted to measure the CFO and IQ-imbalance during an acquisition frame broadcasted by the base-station. Each user terminal measures its own receiver's CFO offset and IQ-imbalance. Because CFO and IQ-imbalance are slowly varying parameters subject to temperature drift, the measurements made on the acquisition frame can be used for a series of subsequent data bursts. At the terminal the CFO offset and IQ-imbalance are compensated for each down-link data burst, for an up-link data burst, the terminal pre-compensates for the measured CFO offset by artificially imposing the measured CFO on the data. Typically the base-station will have a high performant super-heterodyne receiver, so no IQ-imbalance compensation is necessary there. If not, the IQ-imbalance must be measured during user-terminal up-links.

Beside the obtained reduction in MUI, making a precise estimate of the CFO in the acquisition phase, has a supplemental advantage: Residual CFO must be tracked and this is usually done by inserting known pilots symbols in the data on which a phase rotation can be measured. If during the acquisition the CFO is precisely estimated, the remaining CFO will be small and the interval between the pilots can be large, reducing the pilot overhead.

Many known methods for estimating the CFO have the disadvantage that IQ imbalance is not taken into account, whereas for higher SNRs the presence of IQ-imbalance, when disregarded, impairs the CFO estimate.

A number of methods for CFO estimation taking into account the presence of IQ-imbalance already exist. In Feng Yan, Wei-Ping Zhu, and M. Omair Ahmad, "Carrier frequency offset estimation for ofdm systems with i/q imbalance," Proc. the 47th IEEE Midwest Symposium on Circuits and Systems, MWSCAS '04., vol. 2, pp. 633-636, July 2004, an interesting time domain method is proposed that is based on the estimation of a cos φ, with φ the phase rotation caused by the CFO over a given time period. It is shown that this method performs well in comparison to order algorithms like S. Fouladifard and H. Shafiee, "A new technique for estimation and compensation of iq imbalance in ofdm receivers," Proc. of the IEEE 8th International Conference on Communication Systems, vol. 1, pp. 224-228, November 2002, and Guanbin Xing, Manyuan Shen, and Hui Liu, "Frequency offset and i/q imbalance compensation for direct-conversion receivers," Proc. (ICASSP '03) Acoustics, Speech, and Signal Processing, vol. 4, pp. 704-711, April 2003.

The method proposed by Feng Yan, Wei-Ping Zhu, and M. Omair Ahmad however has the disadvantage that it does not produce accurate results, for small CFO's under noisy conditions.

SUMMARY OF CERTAIN INVENTIVE ASPECTS

It is an aim of certain inventive aspects to provide a more accurate method for estimating carrier frequency offset (CFO).

The method is intended for estimating carrier frequency offset introduced on an RF multicarrier signal received via a transmission channel on a direct downconversion analog receiver. The method uses a preamble in the acquisition frame, to make first a measurement of the CFO. After transmission multiple CFO estimates are determined from the received preamble by an estimation method which has a higher precision for a first range of carrier frequency offset values and a lower precision for a second range of carrier frequency offset values. The preamble which is generated on the transmitter comprises multiple sets of training symbols. On at least one of these sets of training symbols, a predetermined artificial carrier frequency offset is introduced, either before transmission or after transmission. This predetermined artificial carrier frequency offset is chosen such that the carrier frequency offset of that set of training symbols of the preamble, after being transmitted via the channel and received on the receiver, is shifted to the first range, in which the used CFO estimation method shows a higher precision. In this way, it can be avoided that the CFO estimation method has values as input which would lead to an imprecise result. The multiple CFO estimates which are obtained are then combined by a direct algebraic relationship to obtain an overall CFO estimate. The direct algebraic relationship cancels out IQ imbalance and is exploited to take noise into account. As a result of the steps of introducing the artificial CFO, cancelling out IQ imbalance and taking noise into account, the accuracy of the CFO estimation method can be highly improved.

In a preferred embodiment of the method, each set comprises at least three training symbols at a regular delay from each other. This has the advantage that the presence of IQ imbalance can be taken into account, which can further improve the accuracy of the CFO estimation method.

The carrier frequency offsets occurring in the method, whether artificial or natural, are preferably modelled as phase rotations. This entails that the overall CFO estimate is determined by combining phase rotations which are determined from each of the received sets of training symbols.

In a preferred embodiment of the method, the noise is taken into account in the direct algebraic relationship by taking a weighted average of multiple CFO estimates. This can further improve the accuracy of the method.

On the one hand, the method can be applied in situations where the CFO introduced by the channel is approximately known or can be approximately predicted. In this case, the introduced artificial CFO is chosen to obtain a total CFO on receiver side within the higher precision range.

On the other hand, the method can also be applied in situations where the CFO introduced by the channel is unknown. In that case, the preamble is generated with at least a first and a second set of training symbols, the training symbols of the first set being equal to those of the second set. A first predetermined artificial carrier frequency offset is introduced on the first set and a second predetermined artificial carrier frequency offset is introduced on the second set. The first and second predetermined artificial carrier frequency offsets are selected to be different in such a way that the carrier frequency offset of at least one of the first and second sets of training symbols of the received preamble is shifted to the first range, i.e. the higher precision range. In this way, it can be assured that the receiver always obtains at least one set of training symbols from which a precise CFO estimate can be determined.

In a preferred embodiment, these first and second predetermined artificial carrier frequency offsets are chosen such that they cause the respective phase rotations between training symbols of ($\phi_1$ and $\phi_2 = (\phi_1 + \pi/2 + $a multiple of $2\pi$. This is especially advantageous if the CFO estimate is determined via a cos $\phi$ estimation method. The introduction of the $\pi/2$ difference in artificial CFO then turns the cosine function for one of the sets of training symbols into a sine function, which is complementary in precision. This ensures that at least one of the functions is within its higher precision range.

In another preferred embodiment of the method, a noise power of the received preamble is determined. This noise power is then used for switching between a maximum likelihood carrier frequency offset estimation method for noise power values above a given threshold and the carrier frequency estimation method as described in the above embodiments for noise power values below a given threshold. This can further improve the accuracy of the method, since maximum likelihood carrier frequency offset estimation is known to be very precise for situations where the noise power dominates over IQ imbalance.

In one embodiment of the method, the artificial CFO is introduced on transmitter side, i.e. upon generating the preamble.

In an alternative embodiment according to the invention, the artificial CFO for shifting the total CFO to the first range is imposed on receiver side, i.e. after the channel's CFO has been introduced by transmission of the preamble. This could for example be done by physically changing the carrier frequency of the receiver, for example by a digitally controlled phase locked loop (PLL) in the receiver, before the demodulation circuitry, so before the IQ split-up. However, other embodiments are also possible.

Another inventive aspect relates to a method for compensating CFO. In this compensation method, the CFO is compensated by the CFO estimate determined with the method as described above.

Another inventive aspect relates to a method for estimating the IQ imbalance. Based on the knowledge of the previously estimated CFO, an IQ imbalance estimation method is proposed to estimate the IQ imbalance on the same preamble. The accuracy of the IQ imbalance estimation is highly dependent on the accuracy of the CFO estimation. Shifting the CFO to the first range will improve the accuracy of the IQ imbalance estimation.

BRIEF DESCRIPTION OF THE DRAWINGS

Certain inventive embodiments will be further elucidated by the following description and the appended figures.

DETAILED DESCRIPTION OF CERTAIN INVENTIVE EMBODIMENTS

Figure 1:
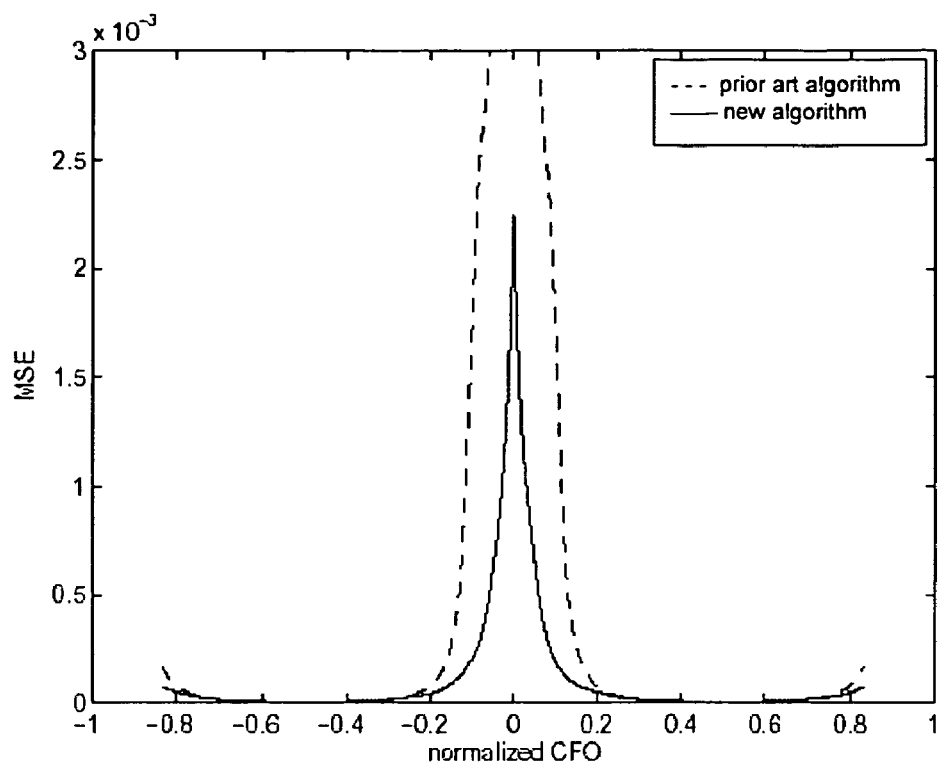
FIG. 1 shows a comparison between the performance of a known algorithm and an algorithm according to one embodiment, both using cos $\phi$ for estimating CFO.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present description, the only relevant components of the device are A and B.

The IQ imbalance of a typical low cost direct down conversion receiver is characterized by 2 parameters: the amplitude imbalance $\epsilon$ between the I and Q branch and the phase orgonality mismatch $\Delta\Phi$ um value for $\epsilon$ of 10% and a maximum of 15° for $\Delta\Phi$.

To model the combined effect of CFO and IQ imbalance the following model is used: if r(k) is the ideal baseband time domain signal at the sample moment k then the signal impacted by CFO and IQ imbalance s(k) can be described as:

$$s(k) = \alpha r(k) e^{o2\pi \frac{CFO}{f_s}k} + \beta r^*(k) e^{-o2\pi \frac{CFO}{f_s}k} \qquad (1)$$

with CFO the CFO frequency in absolute terms, $f_s$ the sample frequency used in the system, $r^*$ the complex conjugate of r and $$\alpha = \cos \Delta\Phi + \varnothing \epsilon \sin \Delta\Phi \qquad (2)$$

$$\beta = \epsilon \cos \Delta\Phi - \varnothing \sin \Delta\Phi \qquad (3)$$

The mobile channel model used in certain applications is based on the 3GPP TR25.996 Spatial channel model, developed within the 3rd Generation Partnership Project and used for simulations of UMTS systems.

In the following, the basic CFO estimation algorithm and the construction of the preamble will be described.

CFO causes a phase rotation that can be measured by observing equal samples delayed by a known period of time. To make the CFO estimate a basic set of 3 equal samples or training symbols are used, separated from each other by a delay of l sample periods. Therefore a preamble is constructed that is a 3 fold repetition of a basic building block. This basic building block is a pseudo random noise sequence of length l, with low peak to average power ratio to avoid clipping and non-linear distortion. From eq. 1 it is seen that the phase rotation caused by the CFO over a distance of l samples is $$\varphi = 2\pi \frac{CFO}{f_s} l \qquad (4)$$

To avoid ambiguity:

$$|\varphi| < \pi \Rightarrow l < \frac{f_s}{2|CFO|} \qquad (5)$$

Inversely the maximum CFO that can be detected without ambiguity for given length l is:

$$M_{CFO} = \pm \frac{f_s}{2l} \qquad (6)$$

In practice the detectable range is smaller. For CFO's close to edge of the range, due to the presence of noise, for some estimates of $\phi$ a jump over the $\pi$ border can occur, resulting in a sign change and a considerable error. The probability of such a jump is highly dependent on the SNR. For an SNR of 0 db, simulations showed that 80% of the maximum range could be used. For generality, the CFO plotted in the graphs, is normalized to the maximum detectable CFO as defined in eq. 6. Taking into account the 80% consideration above, this results in a normalized useable range from −0.8 till +0.8.

The following definitions are made: r(k), k=1:l are the samples from the preamble's basic building block (which is repeated 3 times), as received at the receiver without noise, CFO and IQ-imbalance addition;

$$p(k) = r(k) e^{o2\pi \frac{CFO}{f_s}k}; \qquad (7)$$

$s_1$, $s_2$ and $s_3$ are 3 preamble samples spaced by l samples in time, at the receiver, in the absence of noise but with CFO and IQ-imbalance applied.

Using eq. 1 & 4, the triplet k consisting of s1, s2 and s3 can be expressed as:

$$s_1 = \alpha p(k) + \beta \tilde{p}(k) \qquad (8)$$

$$s_2 = \alpha p(k) e^{j\phi} + \beta \tilde{p}(k) e^{-j\phi} \qquad (9)$$

$$s_3 = \alpha p(k) e^{j2\phi} + \beta \tilde{p}(k) e^{-j2\phi} \qquad (10)$$

With some algebraic deduction one can show that:

$$\frac{s_1 + s_3}{s_2} = 2\cos\varphi \qquad (11)$$

In the presence of noise an estimation of $\cos \phi$ can be made by averaging out over the l successive triplets in the preamble and taking the real part:

$$\cos\varphi = \frac{1}{2l} \Re \sum_{k=1}^{l} \frac{y_1(k) + y_3(k)}{y_2(k)} \qquad (12)$$

with $y_x(k) = s_x(k) + n_x(k)$ for x=1, 2, 3 and $n_x(k)$ the noise value for sample x in triplet k.

This estimation can be improved by weighting the samples. In order to define the weights, the sensitivity to the noise is examined by considering the noise as small variations of $s_1$, $s_2$, $s_3$ and making a multi-variable first order Taylor expansion of the function in eq. 11.

$$\frac{s_1 + n_1 + s_3 + n_3}{s_2 + n_2} \approx 2\cos\varphi + \frac{1}{s_2}(n_1 - 2\cos\varphi n_2 + n_3) \qquad (13)$$

If we define the noise variance as $\sigma_n^2$, then the noise variance of the first order noise term in eq. 13 is:

$$\sigma^2 = \frac{2}{|s_2|^2}(1 + 2\cos^2\varphi)\sigma_n^2 \qquad (14)$$

$\sigma^2$ is proportional with $1/|s_2|^2$. In a sum of components with different variances, an optimal estimation in the mean square error sense can be obtained by weighting the components inversely proportional to their variance. Taking into account $|y_2|^2 = y_2 y_2^*$; the improved estimate of $\cos\varphi$ becomes:

$$\cos\varphi = \frac{\Re \sum_{k=1}^{l} y_1(k)y_2^*(k) + y_3(k)y_2^*(k)}{2\sum_{k=1}^{l} |y_2(k)|^2} \qquad (15)$$

In order to make a performance comparison with method proposed by Feng Yan, Wei-Ping Zhu, and M. Omair, the estimate of $\cos\varphi$ they propose is expressed in the notation of this model:

$$\cos\varphi = \frac{\sum_{k=1}^{l} \Im(y_1(k)y_3^*(k))}{2\sum_{k=1}^{l} \Im(y_1(k)y_2^*(k))} \qquad (16)$$

From $\cos\varphi$ the CFO can be derived by inversion and scaling:

$$CFO = \frac{f_s}{2\pi l}\cos^{-1}(\cos\varphi) \qquad (17)$$

In FIG. 1 a comparison is shown between the two methods. The mean square error on the estimation of the normalized CFO is plotted for normalized CFO's ranging from −0.8 till +0.8. A length of l=64 was chosen, IQ-imbalance parameters $\epsilon$=10% and $\Delta\Phi$=15°, the SNR is 20 db, the sample frequency $f_s$=20 Mhz and the carrier frequency $f_c$=2 Ghz. This plot shows a similar performance, except for small and large CFO's where both methods perform badly, especially for small CFO's. For small CFO's ($\varphi \approx 0$), the inverse of $\cos\varphi$: $\cos^{-1}$, is very sensitive to small variations as can be seen from it's derivative, which is equal to $1/\sin\varphi$. So even a small amount of noise will have a big impact. The method proposed by Feng Yan, Wei-Ping Zhu, and M. Omair has a supplemental problem. The estimate in eq. 16 can be rewritten as:

$$\cos\varphi = \frac{A\sin 2\varphi + n_a}{A\sin\varphi + n_b} \qquad (18)$$

with A a real factor and $n_a$, $n_b$ random noise terms. If $\varphi$ goes to 0 the noise becomes dominant and the result will become the fraction of 2 random terms. The method from eq. 15 has a problem of another kind. The denominator is a sum of $|y_2|^2$ terms. The estimate of this sum becomes:

$$E\left(\sum_{k=1}^{l} |y_2(k)|^2\right) = \sum_{k=1}^{l} |s_2(k)|^2 + l\sigma_n^2 \qquad (19)$$

The noise variance is added to the desired value of the denominator, making the estimate of $\cos\varphi$ biased.

In the following, it will be described how the CFO estimation algorithm described above can be made more accurate according to one embodiment. The following solution is particularly useful in situations where the CFO introduced by the channel cannot be known or predicted in advance.

The above mentioned inaccuracies related to eq. 15 can be remedied by adding a second part to the preamble, which comprises a second set of training symbols or samples. This second part is created by taking the original preamble sequence and super-imposing an artificial CFO on it at the transmitter. An artificial CFO could also be imposed on both the first and second sets of training symbols, but for the sake of simplicity it is assumed in the following that no or zero artificial CFO is imposed on the first set.

The artificial CFO for the second set is chosen such that over the length of l samples, an additional phase rotation of $\pi/2$ will be added to the rotation caused by the natural CFO in the system. In our case this means:

$$ACFO = \frac{f_s}{4l} \qquad (20)$$

The total preamble, composed of 2 parts each with length 3l, becomes:

$$p_1(k, x) = r(k)$$

$$p_2(k, x) = r(k)e^{j2\pi \frac{ACFO}{f_s}[(x-1)*l+(k-1)]} \text{ for } k = 1:l \text{ and } x = 1, 2, 3$$

In practice the two parts of the preamble are preferably both preceded by a cyclic prefix to absorb the channel response. The artificial CFO on the second part will cause a shift in the frequency domain. The frequency components of the basic building block sequence r(k) are preferably chosen such that the shift does not put any carriers out of band or on the DC carrier.

The cos of the phase rotation between 2 samples in the second part of the preamble, separated by a distance l is:

$$\cos\left(2\pi\frac{CFO + ACFO}{f_s}l\right) = \cos\left(\varphi + \frac{\pi}{2}\right) = -\sin\varphi \qquad (21)$$

So an estimate of $\sin\varphi$ can be obtained by using eq. 15 on the second part of the preamble:

$$\sin\varphi = -\frac{\Re\sum_{k=1}^{l} z_1(k)z_2^*(k) + z_3(k)z_2^*(k)}{2\sum_{k=1}^{l} |z_2(k)|^2} \qquad (22)$$

where $z_x(k)$ for $x=1, 2, 3$ and $k=1:l$, are the received noisy sample values of the second part of the preamble.

By combining the cos and sin a new estimate of the CFO is obtained. Depending on the sign of cos φ we get:

$$\cos\varphi \geq 0, \; CFO = \frac{f_s}{2\pi l}\tan^{-1}\left(\frac{\sin\varphi}{\cos\varphi}\right) \tag{23}$$

$$\cos\varphi < 0, \; CFO = \frac{f_s}{2\pi l}\left[\tan^{-1}\left(\frac{\sin\varphi}{\cos\varphi}\right) + \text{sign}(\sin\varphi)\pi\right] \tag{24}$$

Note that now, due to the sin φ estimate also the sign of the CFO is known, cos φ alone is ambiguous.

The derivative of $\tan^{-1}$ is $\cos^2\varphi$ and takes a value of 1 for φ=0, so there is no noise amplification, which was the case for the $\cos^{-1}$ function used in eq. 17.

As was shown in eq. 19 the bias in the cos φ estimate is caused by the $$\sum_{k=1}^{l}|y_2(k)|^2$$

term. The sin φ/cos φ division results in a division of the 2 sum terms:

$$\frac{\sum_{k=1}^{l}|y_2(k)|^2}{\sum_{k=1}^{l}|z_2(k)|^2}.$$

If the expected value of both sum terms was the same, this would perfectly eliminate the bias of the measurement. The expected value (eq. 19) consists of a noise variance term and the energy contained in the $s_2$ samples of the preamble. The noise variance is the same in both sums. The energy contained in the $s_2$ samples in not the same for both preambles but comparable. They are not the same due to the combined effect of IQ-imbalance and CFO and due to the fact that the artificial CFO on the second preamble generates a frequency shift and by consequence a different channel response. Although the compensation for the bias is not perfect in practice it gives a good result, also for low SNRs.

In order to benchmark the performance of the above described algorithm, over the targeted SNR range of 0 till 30 db, a comparison is done with the classical Maximum Likelihood (ML) estimation for CFO which does not take into account the presence of IQ imbalance. The ML estimation is applied on both parts of the preamble and the correlation distance is l. For the ML method we abandon the triplet index notation and define y(k) and z(k) now with k=1:3l as the sample values of both parts of the preamble at the receiver. The CFO estimated with ML method is:

$$CFO = \frac{f_s}{2\pi l}\text{angle}\left[\sum_{k=1}^{2l}y(k+l)y*(k) + e^{-j\frac{\pi}{2}}\sum_{k=1}^{2l}z(k+l)z*(k)\right] \tag{25}$$

Note that on the sum from the second part, a de-rotation of π/2 is applied, to compensate the effect of the artificial CFO.

Figure 2:
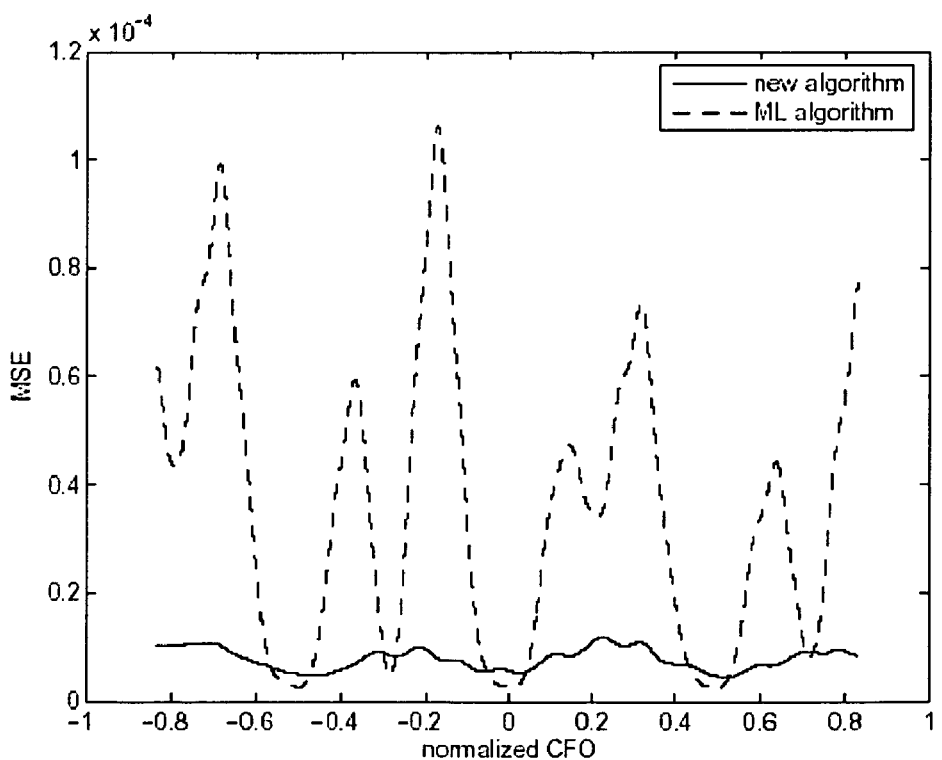
FIG. 2 shows a comparison between the performance of the known maximum likelihood algorithm for estimating CFO and a preferred algorithm according to one embodiment for estimating CFO.

FIG. 2 shows a comparison of the mean square error on the estimation of the normalized CFO, at 20 db SNR, between the new algorithm (eq. 23, 24) and the ML method (eq. 25). It is seen by comparison with FIG. 1 that for small CFO's the performance is an order of magnitude better than the method based on a cos φ only estimation. The above described algorithm also outperforms the ML method, which suffers from the impact of IQ-imbalance.

Figure 3:
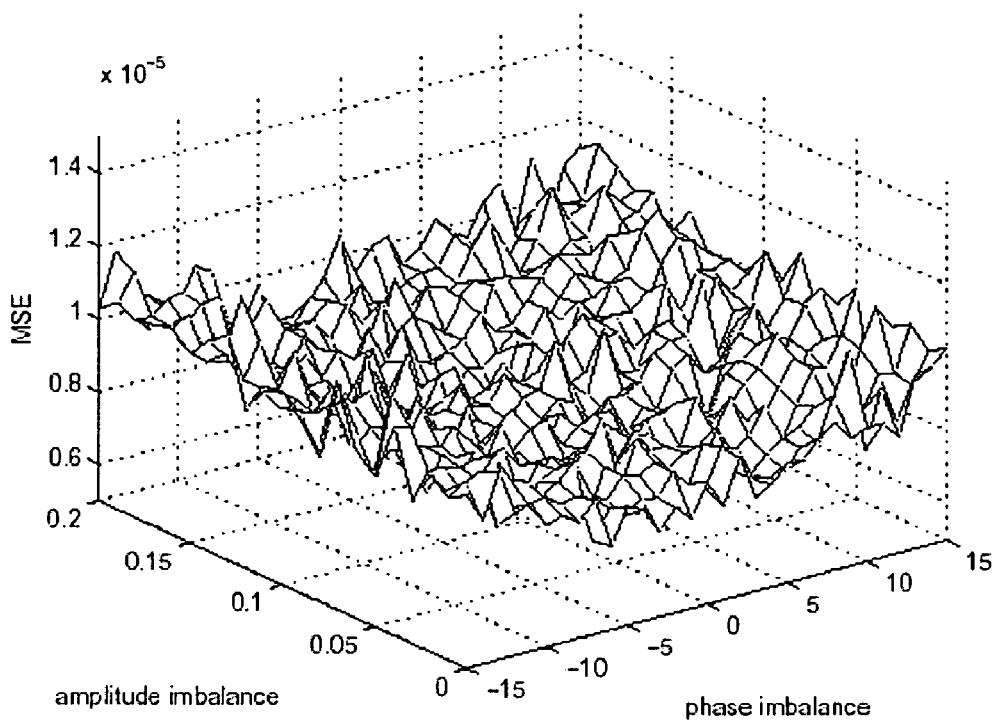
FIG. 3 shows the mean square error on the CFO estimation algorithm according to one embodiment for different values of the IQ-imbalance parameters

In FIG. 3 the mean square error on the CFO estimation is shown for different values of the IQ-imbalance parameters: amplitude mismatch from 0% till 20% and phase mismatch from −15° till 15°. The graph shows not much variation in performance even for high IQ-imbalance values.

Figure 4:
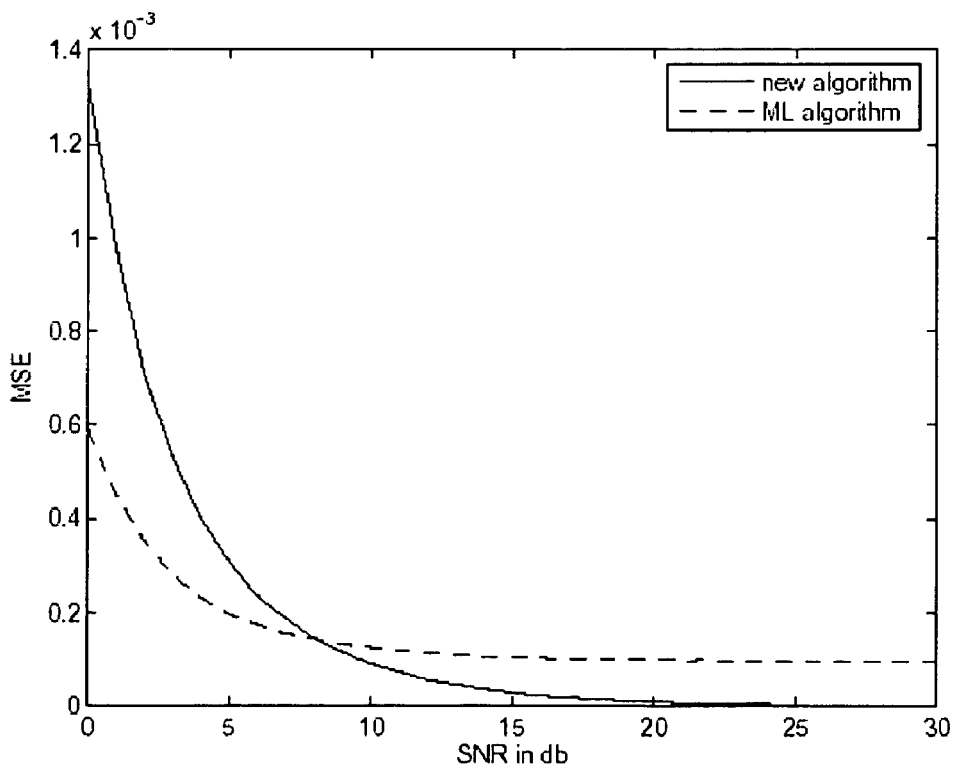
FIG. 4 shows the standard deviation of the mean square error on the CFO determined by the known maximum likelihood algorithm and the preferred algorithm according to one embodiment, for a SNR range of 0 till 30 db.

In FIG. 4 the standard deviation of the mean square error on the CFO is plotted for an SNR range of 0 till 30 db for a normalized CFO of −0.17 (this is the point where the ML method has the worst performance, see FIG. 2). We see that below 8.2 db the ML method performs better than the new algorithm. This is because at these low SNRs the impact of noise becomes dominant over the impact of IQ-imbalance. For high SNRs, the new algorithm keeps improving the estimate while the ML method floors.

In order to take the best of both methods a choice can be made depending on the SNR. To do this, a threshold or crossover point and a SNR are determined. The cross-over point is determined by the amount of IQ-imbalance in the system. We assume a worst case scenario and use the maximum specified IQ-imbalance parameters of the receiver to determine the cross-over point. An estimate of the SNR can be obtained as follows: From eq. 13 & 14 it can be seen that the variance $\sigma^2$ of $y_1+y_3/y_2$ is proportional with the noise variance $\sigma_n^2$. This allows to estimate $\sigma_n^2$:

$$\sigma_n^2 = \frac{\sum_{k=1}^{l}|y_2(k)|^2\left|\frac{y_1(k)+y_3(k)}{y_2(k)} - 2\cos\varphi\right|^2}{2(1+2\cos^2\varphi)l} \tag{26}$$

This estimate can be of course be improved by making a second estimate on the second part of the preamble and averaging both estimates. $\sigma_n^2$ will slightly under-estimate the real $\sigma_n^2$; this is because the estimate is based on a first order Taylor expansion and the high order noise terms are ignored. Simulation results show that around the cross-over point the estimate is 0.2 db below the actual value. For a SNR of 0 db the estimate is 0.8 db below the actual value.

The chosen preamble structure can also be exploited to obtain an accurate IQ-imbalance compensation. In A. Tarighat and A. H. Sayed, "On the baseband compensation in ofdm systems," Proc. (ICASSP'04) Acoustics, Speech and Signal Processing, vol 4, pp. 1021-1024, May 2004, it is shown that a time domain compensation of the IQ-imbalance is possible if β/α* is known. From s(k)=hap(k)+βp*(k), the term in p*(k) can be eliminated as follows:

$$s(k) - \frac{\beta}{\alpha^*}s^*(k) = \frac{|\alpha|^2 - |\beta|^2}{\alpha^*}p(k) \tag{27}$$

In a second step the CFO can be compensated by multiplying with $e^{-j2\pi CFOk}$ $$\frac{|\alpha|^2-|\beta|^2}{\alpha^*}p(k)e^{-j2\pi CFOk} = \frac{|\alpha|^2-|\beta|^2}{\alpha^*}r(k) \quad (28)$$

The constant $|\alpha|^2-|\beta|^2/\alpha^*$ will be absorbed in the channel estimation.

In the absence of noise, with $s_1$ and $s_2$ defined as in eq. 8 & 9 it can be shown with some algebraic work that $$\frac{\beta}{\alpha^*} = \frac{s_2 - e^{j\varphi}s_1}{s_2^* - e^{j\varphi}s_1^*} \quad (29)$$

To examine the sensitivity to noise, q is defined as the noisy version of $\beta/\alpha^*$ and a multi-variable Taylor expansion is made of eq. 29 with respect to $s_1$, $s_1^*$, $s_2$ and $s_2^*$. A first order approximation of the noisy estimate q becomes:

$$q \approx \frac{\beta}{\alpha^*} + \frac{1}{\alpha^*p^*(-2j\sin^2\varphi)}\left(n_2 - \frac{\beta}{\alpha^*}n_2^* - e^{j\varphi}n_1 + \frac{\beta}{\alpha^*}n_1^*\right) \quad (30)$$

In this first order approximation the noise on q is Gaussian and the variance is:

$$V = \frac{\left(1+\left|\frac{\beta}{\alpha^*}\right|^2\right)\sigma_n^2}{|p|^2|\alpha|^2 2\sin^2\varphi} \quad (31)$$

For each pair in the preamble: $s_1(k)$, $s_2(k)$ with k=1:l and $s_2(k)$, $s_3(k)$ with k=1:l an estimate q can be made. The estimate of $\beta/\alpha^*$ will be obtained, by averaging the different q estimates. Because in eq. 31 V is inversely proportional to $|p|^2$, the optimal estimate can be made by weighting q with a weight proportional to $|p|^2$. $|p|^2$ is not known but we can use a weight w approximately proportional to $|p|^2$:

$$w=|s_1|^2+|s_2|^2+|s_3|^2 \quad (32)$$

By using eq. 8, 9, 10 w becomes:

$$w=3(|\alpha|^2+|\beta|^2)|p|^2+2\Re[\alpha\beta^*p^2(1+e^{j2\Phi}+e^{j4\Phi})] \quad (33)$$

Eq. 33 shows the approximation comes down to neglecting a term in $\alpha\beta^*$ versus a term in $|\alpha|^2+|\beta|^2$. Because $|\alpha|\square|\beta|$ this is acceptable. The maximum value of the sum $(1+e^{j2\Phi}+e^{j4\Phi})$ is 3, this is when $\phi=0$, for other values of $\phi$ the norm of the sum will be smaller. So on average, over all $\phi$, the sum will reduce the impact of the non-desired $\alpha\beta^*$ term versus the $3(|\alpha|^2+|\beta|^2)$ term.

Using the noisy samples of the first part of the preamble $y_1(k)$, $y_2(k)$, $y_3(k)$ the estimate of the ratio $\beta/\alpha^*$ becomes:

$$R_1 = \frac{\sum_{k=1}^{l}w_y(k)\left(\frac{y_2(k)e^{j\varphi}y_1(k)}{y_2^*(k)-e^{j\varphi}y_1^*(k)} + \frac{y_3(k)-e^{j\varphi}y_2(k)}{y_3^*(k)-e^{j\varphi}y_2^*(k)}\right)}{\sum_{k=1}^{l}w_y(k)} \quad (34)$$

with the weights $w_y(k)=|y_1(k)|^2+|y_2(k)|^2+|y_3(k)|^2$

In eq. 34 $R_1$ is a weighted sum of terms, polluted with Gaussian noise (in a first order approximation). The variance of these noise terms is given by eq. 31 and is always inversely proportional with $\sin^2\phi$. So the variance of the sum in eq. 34 will also be inversely proportional with $\sin^2\phi$. This $\sin^2\phi$ dependency is not the only dependence of the variance of $R_1$ on $\phi$. The weights $w_y(k)$ also depend on $\phi$ but as shown above in eq. 33 the dependency of the weights on $\phi$ is small. So the dependency on $\phi$ of the variance of $R_1$ through the weights can be neglected.

In a similar fashion $\beta/\alpha^*$ can be estimated on the second preamble.

$$R_2 = \frac{\sum_{k=1}^{l}w_z(k)\left(\frac{z_2(k)e^{j\varphi}z_1(k)}{z_2^*(k)-e^{j\varphi}z_1^*(k)} + \frac{z_3(k)-e^{j\varphi}z_2(k)}{z_3^*(k)-e^{j\varphi}z_2^*(k)}\right)}{\sum_{k=1}^{l}w_z(k)} \quad (35)$$

with the weights $w_z(k)=|z_1(k)|^2+|z_2(k)|^2+|z_3(k)|^2$.

Due to the super-imposed artificial CFO the variance of $R_2$ will be inversely proportional to $\cos^2\phi$. An optimal estimate can be obtained by combining $R_1$ and $R_2$ and weighing them with respectively $\sin^2\phi$ and $\cos^2\phi$. An estimate of $\phi$ was obtained during the CFO estimation, the CFO is proportional with is $\phi$ (see eq. 23 & 24). From this estimate of $\phi$, $\sin^2\phi$ and $\cos^2\phi$ can be calculated. The final estimate of $\beta/\alpha^*$ becomes:

$$\frac{\beta}{\alpha^*} = \sin^2\hat{\varphi}R_1 + \cos^2\hat{\varphi}R_2 \quad (36)$$

Remark that if there was only the first part of the preamble the variance for values of $\phi$ close to 0 would be very big and by consequence the estimate would be imprecise. The combined use of both preamble parts makes the estimate of $\beta/\alpha^*$ less dependent on the value of $\phi$.

Figure 5:
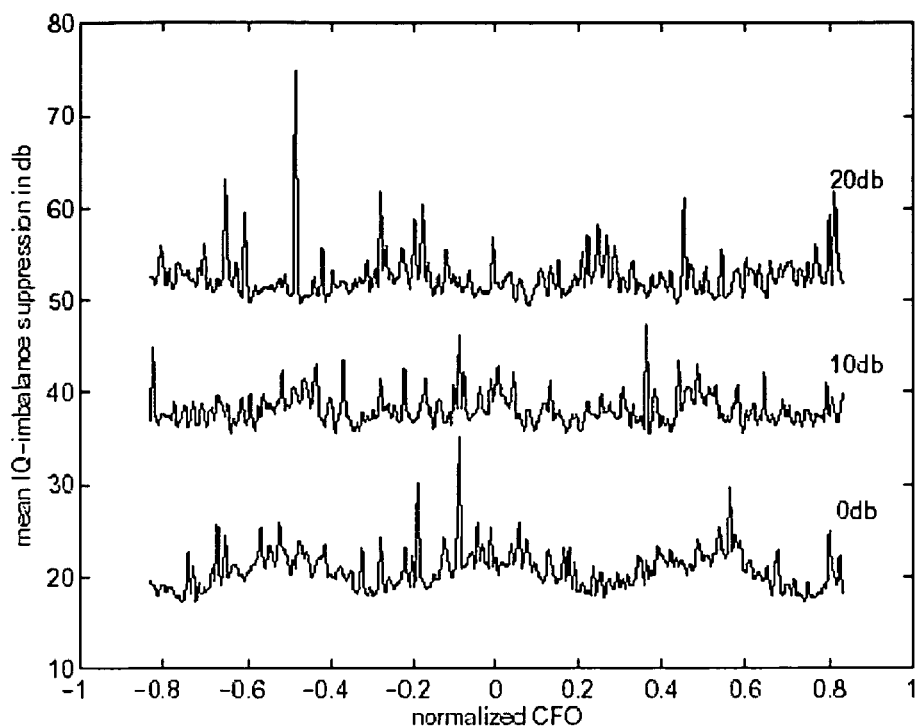
FIG. 5 shows the performance of an IQ-imbalance compensation method according to one embodiment, in function of the normalized CFO and for respectively 0 db, 10 db, 20 db SNR.
Figure 6:
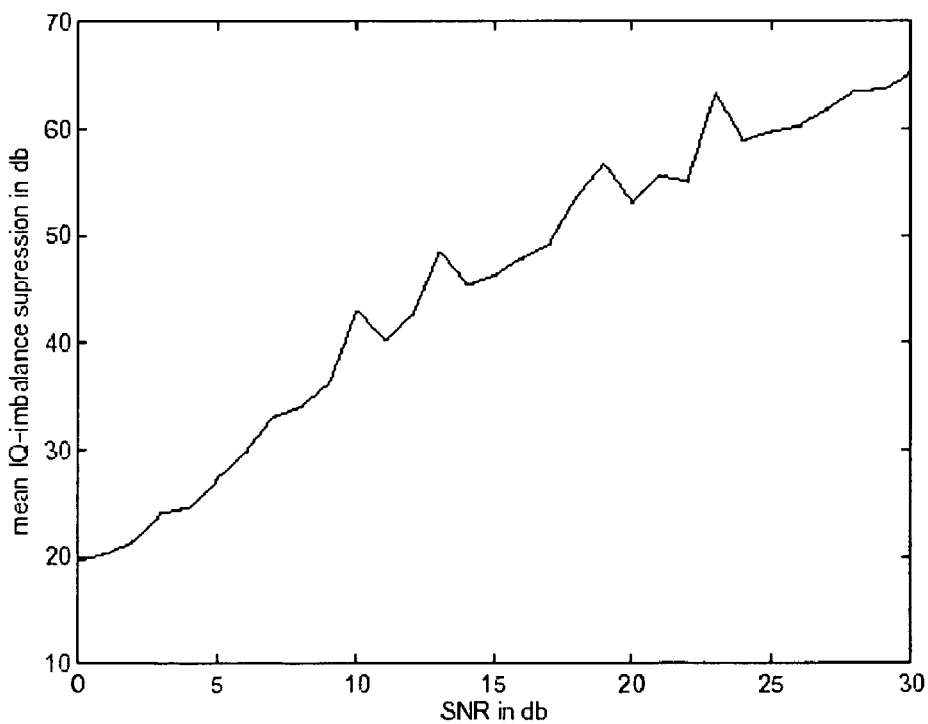
FIG. 6 shows the performance of the IQ-imbalance compensation method according to one embodiment over the entire SNR range from 0 db till 30 db.

To see the performance of the proposed IQ-imbalance compensation method a series of simulations for different channels was made with a QAM64 data stream. For each simulation a CFO and IQ-imbalance estimate were made on the preamble. With these estimates the proposed IQ-imbalance compensation was applied on the received data stream. The IQ compensated data stream was then subtracted from the received data stream at the stage in the receiver where noise and CFO were applied but before application of IQ imbalance. The residual error is a measure for the remaining non-compensated IQ imbalance. In FIG. 5 a plot is shown of the average IQ-imbalance suppression error (related in db to the signal without IQ-imbalance) in function of the normalized CFO and for respectively, 0 db, 10 db, 20 db SNR. To show the performance over the entire SNR range from 0 db till 30 db a plot is made in FIG. 6 of the average IQ-imbalance suppression error versus the SNR.

In the following, a method for compensating CFO and IQ imbalance will be described, in which combines the above presented algorithms are incorporated.

In this method for compensating CFO and IQ imbalance, the acquisition of CFO and IQ imbalance is done in 3 steps. First there is a rough CFO estimation, secondly a fine CFO estimation and finally the IQ imbalance estimation. All three steps use the same preamble, which comprises at least one part on which the artificial CFO is imposed as described above. The rough and fine CFO estimations are based on time domain measurements of angle rotations between samples that are repeated throughout the preamble. The IQ imbalance estimation uses the result from the CFO estimation and is also performed in the time domain.

Figure 7:
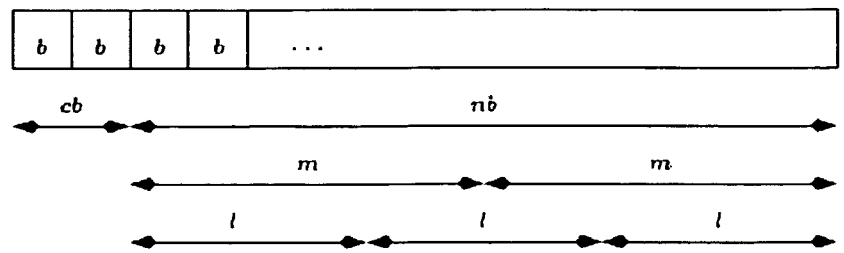
FIG. 7 shows the structure of the preamble used in the method according to one embodiment.
Figure 7:
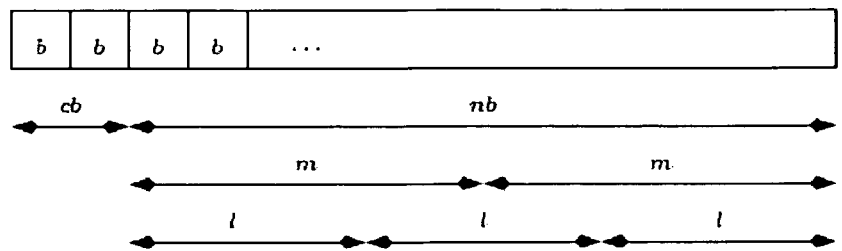

The preamble has the structure of FIG. 7. The basic building block is a short pseudo random sequence with a low peak-to-average power ratio and length b. Short means short enough to cover the entire possible CFO range with an unambiguous angle rotation that is in absolute value smaller than π. The angle rotation caused by the CFO with frequency $f_o$ over a distance of b samples is $$\psi = 2\pi f_o \frac{b}{f_s}$$

where $f_s$ is the sample frequency of the system. The first part of the preamble $Y_T(t)$, is a repetition of c+n times the basic building block of b samples totaling b(c+n) samples (t=1 ... b(c+n)). The first c basic building blocks will be used as cyclic prefix and dropped at the receiver. n is chosen as an integer multiple of 2 and 3. This allows to split the remaining nb samples, either in 3 equal groups of length $$l = \frac{n}{3}b$$

or in 2 equal groups of length $$m = \frac{n}{2}b.$$

The second part of the preamble $z_T(t)$, is built by taking the first part and applying an artificial CFO on it at the transmitter. The artificial CFO, $f_a$ is chosen such that over a distance of l samples an additional angle rotation of $$x2\pi + \frac{\pi}{2}$$

occurs:

$$f_a = \frac{f_s}{l}\left(x + \frac{1}{4}\right)$$

with x an integer number. To designate the samples of the preamble at the receiver, the following definitions are made: let y(k) and z(k), with k=1 ... nb, be the nb samples of respectively the first part and second part of the preamble, without cyclic prefix, as captured at the receiver.

The purpose of the rough estimation is to make an estimate that covers the entire required CFO range. It must produce a result that allows to reduce the CFO range in which the fine CFO estimation will operate. The result of the rough estimation must be precise enough to avoid ambiguity after combination with the result of the fine CFO estimation. The CFO will be estimated by measuring the angle rotation between repeated samples separated by a distance b. Without IQ imbalance the optimal solution is the existing Maximum Likelihood (ML) algorithm.

$$f_r = \frac{f_s}{2\pi b}\text{angle}\left[\sum_{k=1}^{(n-1)b} y(k+b)y^*(k)\right] \quad (37)$$

But the IQ imbalance introduces a bias in the estimation that is CFO dependent. This bias can be largely compensated by using other weights than the ones used in ML to average the angle measurements. The weights for ML are |y(k+b)y*(k)|. The new weights are built by averaging the energy in each sample of the basic building block over its repetitions through the preamble. This tends to average out the effect of IQ imbalance. With the sample index i=0 ... b−1, the weights for the first and second part of the preamble become:

$$W_y(i) = \frac{\sum_{s=0}^{n-1}|y(i+1+s*b)|^2}{n} \quad (38)$$

$$W_z(i) = \frac{\sum_{s=0}^{n-1}|z(i+1+s*b)|^2}{n} \quad (39)$$

The adapted estimation becomes:

$$e^{j\psi_y} = \frac{\sum_{k=1}^{(n-1)b}\frac{y(k+b)y^*(k)}{|y(k+b)y^*(k)|}W_y(\text{mod}(k,b))}{\sum_{k=1}^{(n-1)b}W_y(\text{mod}(k,b))} \quad (40)$$

where mod is the modulo operator. A similar operation can be done on the second part of the preamble but we need to correct for the artificial CFO introduced on it.

$$e^{j\psi_z} = e^{-j2\pi f_a \frac{f_s}{b}}\frac{\sum_{k=1}^{(n-1)b}\frac{z(k+b)z^*(k)}{|z(k+b)z^*(k)|}W_z(\text{mod}(k,b))}{\sum_{k=1}^{(n-1)b}W_z(\text{mod}(k,b))} \quad (41)$$

The combination of both estimates yields:

$$f_r = \frac{f_s}{2\pi b}\text{angle}\left[\frac{e^{j\psi_y}+e^{j\psi_z}}{2}\right] \quad (42)$$

The fine estimation uses a longer distance between samples and allows a more accurate measurement in a smaller CFO range. For optimal precision a choice must be made between 2 fine estimation algorithms depending on the SNR. For high SNRs, the above described new algorithm is used that estimates the CFO, taking into account the presence of the IQ imbalance (hereafter called the CFO-with-IQ algorithm). For low SNRs, where the Gaussian noise is dominant over the IQ imbalance the ML algorithm is used because it gives a better performance.

Sequentially the fine CFO estimation is done as follows. First the CFO-with-IQ algorithm is used to obtain a first CFO estimate. With the results from the CFO-with-IQ algorithm also the noise and SNR are estimated. If the SNR is too low, the ML algorithm is used to obtain the CFO estimate, else the CFO estimate from the new algorithm is used. Finally the rough and fine estimates are combined to obtain an unambiguous CFO estimate.

The main principles of the CFO-with-IQ algorithm are the following. The basic estimation unit is based on 3 samples separated by a distance l. Using 3 samples permits to make an estimate of cos φ that is independent of the IQ imbalance (φ is the angle rotation caused by the CFO over a distance l). In the absence of noise it can be shown that:

$$\frac{y(k) + y(k + 2l)}{y(k + l)} = 2\cos\varphi \quad (43)$$

In the presence of noise, the estimation is improved by using multiple sets of 3 samples, (l in total) and making a weighted average of these estimates. The weights are chosen inversely proportional with the variance of the estimations. The estimate becomes:

$$\cos\varphi = \frac{\mathcal{R}\sum_{k=1}^{l} y(k)y^*(k + l) + y(k + 2l)y^*(k + l)}{2\sum_{k=1}^{l} |y(k + l)|^2} \quad (44)$$

The estimate is done separately on both parts of the preamble. Thanks to the artificial CFO on the second part of the preamble, an additional angle rotation will occur which is $$\cos\left(\varphi + x\pi + \frac{\pi}{2}\right) = -\sin\varphi$$

Because $$2\pi f_a \frac{l}{f_s} = x\pi + \frac{\pi}{2}.$$

an estimate of sin φ is obtained to complement the estimate of cos φ on the first part of the preamble. The estimate of cos φ does not reveal the sign of φ nor does it yield a precise estimate of φ around φ=0 (small CFOs). This is due to the slope of $\cos^{-1}$ around (φ=0. Both estimates can now be combined and an unambiguous and a precise estimate of φ can be obtained:

$$\cos\varphi \geq 0, \hat{\varphi} = \tan^{-1}\left(\frac{\sin\varphi}{\cos\varphi}\right) \quad (45)$$

$$\cos\varphi < 0, \hat{\varphi} = \tan^{-1}\left(\frac{\sin\varphi}{\cos\varphi}\right) + \text{sign}(\sin\varphi)\pi \quad (46)$$

Above, it has also been shown that with the results from the above algorithm (cos φ and sin φ) also the noise variance can be estimated:

$$\sigma_y^2 = \frac{\sum_{k=1}^{l}|y(k+l)|^2 \left|\frac{y(k) + y(k+2l)}{y(k+l)} - 2\cos\varphi\right|^2}{2(1 + 2\cos^2\varphi)l} \quad (47)$$

$$\sigma_z^2 = \frac{\sum_{k=1}^{l}|z(k+l)|^2 \left|\frac{z(k) + z(k+2l)}{z(k+l)} - 2\sin\varphi\right|^2}{2(1 + 2\sin^2\varphi)l} \quad (48)$$

$$\sigma_n^2 = \frac{\sigma_y^2 + \sigma_z^2}{2} \quad (49)$$

The estimate is based on the observed variation of cos φ and sin φ. This noise variance estimate is used to decide which fine estimation method should be used.

If the SNR is too low the existing ML algorithm is used to do the fine estimation. Now the two group structure (groups of length m), of the preamble is used and the correlation distance between 2 samples is m. ML is performed on both parts of the preamble and on the second part the artificial CFO is subtracted. Both measurements are then averaged.

Finally the rough and fine estimates are combined to obtain a correct CFO estimate. If φ is the result from the fine estimation then the real angle rotation must be aπ+φ, with a an integer number. The ambiguity is resolved by choosing a such that the difference between ψ (the rough estimate) and aπ+φ is minimal. This works provided that the error on the rough estimate does not exceed $f_s/2l$ when the CFO-with-IQ algorithm is used and $f_s/2m$ when the ML algorithm is used.

Figure 8:
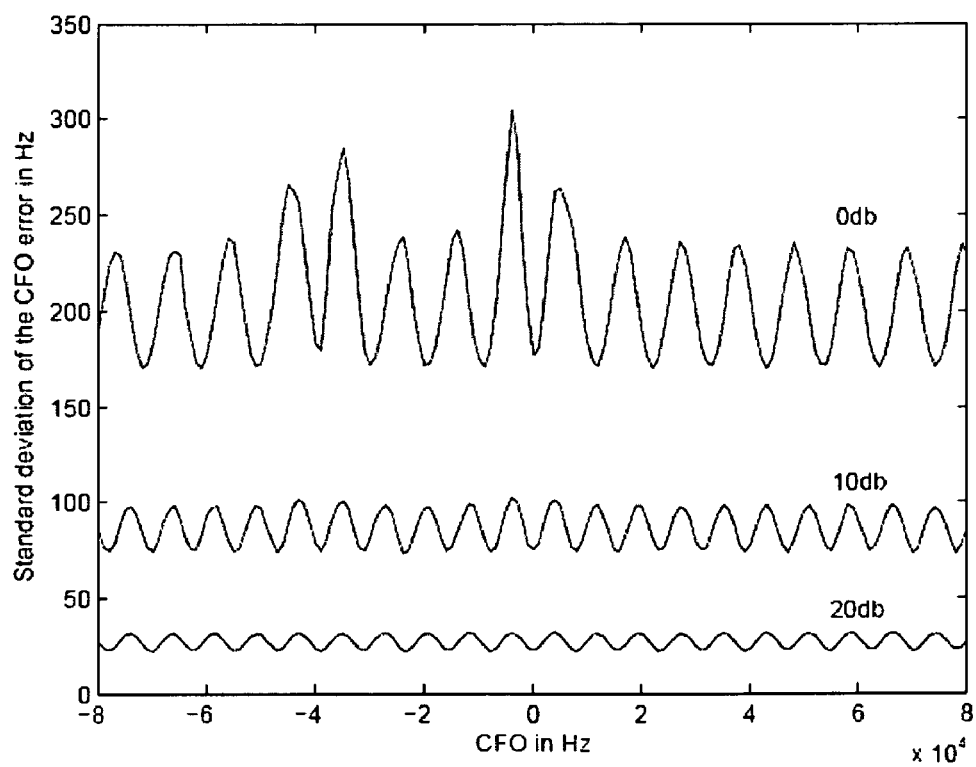
FIG. 8 shows the performance of a CFO and IQ-imbalance compensation method according to one embodiment, in function of the normalized CFO and for respectively 0 db, 10 db, 20 db SNR.
Figure 9:
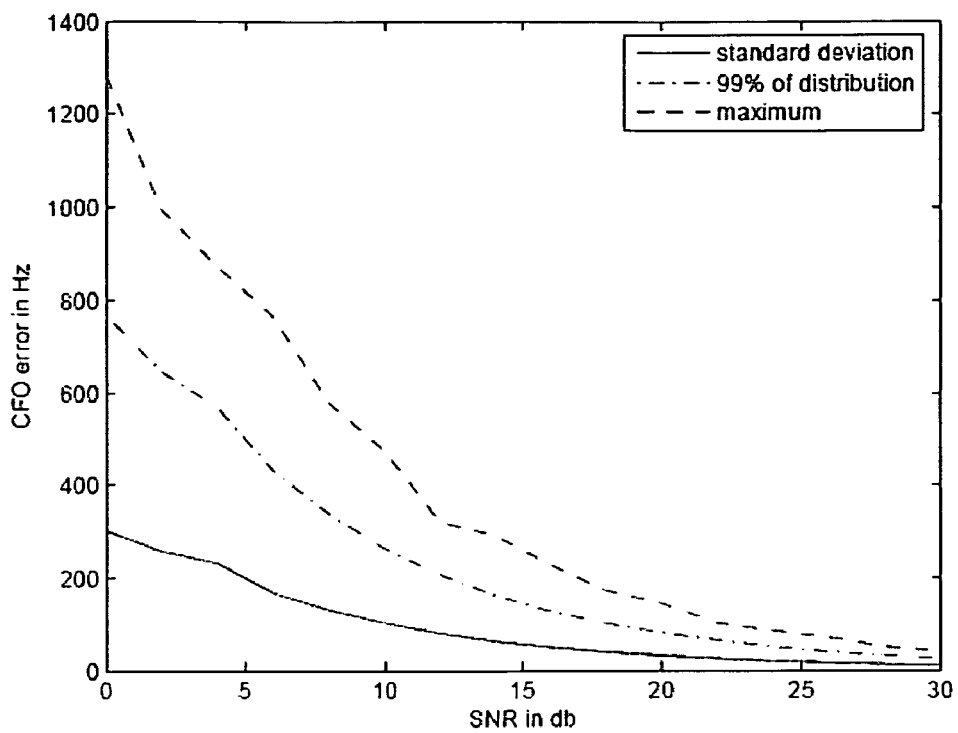
FIG. 9 shows the CFO error versus the SNR ranging from 0 db till 30 db.

To show the performance simulations were made for the following system: carrier frequency 2 GHz, sample frequency $f_s$=5 MHz, required CFO range −80 KHz till 80 KHz, IQ imbalance: α=0.1, β=15°. The total preamble length is 1024 samples, b=16, c=2, n=30, l=160, m=240. In the simulations 500 mobile channel have been used. The results are shown in FIG. 8. The standard deviation of the error on the CFO measurement is shown versus the CFO range for and SNRs of 0 db, 10 db and 20 db. The results show an accurate CFO estimation over the required CFO range. In FIG. 9 the CFO error is shown versus the SNR ranging from 0 till 30 db. The applied CFO is chosen equal to −4 Khz, the worst case from FIG. 6. The graphs shown are the standard deviation, the 99% cumulative distribution limit (99% of the CFO errors are below this value) and the maximum measured CFO error.

The third step is the estimation of the IQ imbalance. To compensate the IQ imbalance, it is sufficient to know β/α*. With $f_o$ the CFO frequency and $$\theta = 2\pi f_o \frac{l}{f_s}$$

the angle rotation caused over a distance of l samples, it can be shown that in the absence of noise:

$$\frac{\beta}{\alpha^*} = \frac{y(k+l) - e^{j\theta}y(k)}{y^*(k+l) - e^{j\theta}y^*(k)}. \quad (50)$$

In practice the obtained CFO estimate will be used to estimate θ and the estimation of β/α* will be done by making a weighted average over different samples k. Above, it has been shown that the variance of the estimate of $\beta/\alpha^*$ for sample k, is in approximation inversely proportional to $W_y(k)$, the weights used in the rough CFO estimation. Using the weights $W_y(k)$ and averaging over the samples k yields:

$$R_1 = \frac{\sum_{k=1}^{2l} W_y(k) \frac{y(k+l) - e^{j\hat{\theta}} y(k)}{y^*(k+l) - e^{j\hat{\theta}} y^*(k)}}{\sum_{k=1}^{2l} W_y(k)} \quad (51)$$

A similar estimate can be made on the second part of the preamble, yielding:

$$R_2 = \frac{\sum_{k=1}^{2l} W_z(k) \frac{z(k+l) - e^{j(\hat{\theta}+\frac{\pi}{2})} z(k)}{z^*(k+l) - e^{j(\hat{\theta}+\frac{\pi}{2})} z^*(k)}}{\sum_{k=1}^{2l} W_z(k)} \quad (52)$$

Above, it has been shown that the variance of $R_1$ and $R_2$ is inversely proportional to respectively $\sin^2 \theta$ and $\cos^2 \theta$. A balanced estimate of $\beta/\alpha^*$ is made by weighting $R_1$ and $R_2$ inversely proportional to their variance:

$$\frac{\beta}{\alpha^*} = \sin^2 \hat{\theta} R_1 + \cos^2 \hat{\theta} R_2. \quad (53)$$

Remark that it is thanks to the use of the 2 parts of the preamble that a precise estimate can be obtained. If there was only the first part of the preamble, without the artificial CFO, the variance for values of θ close to 0 (small CFOs), would get very large and result in an imprecise estimate.

Figure 10:
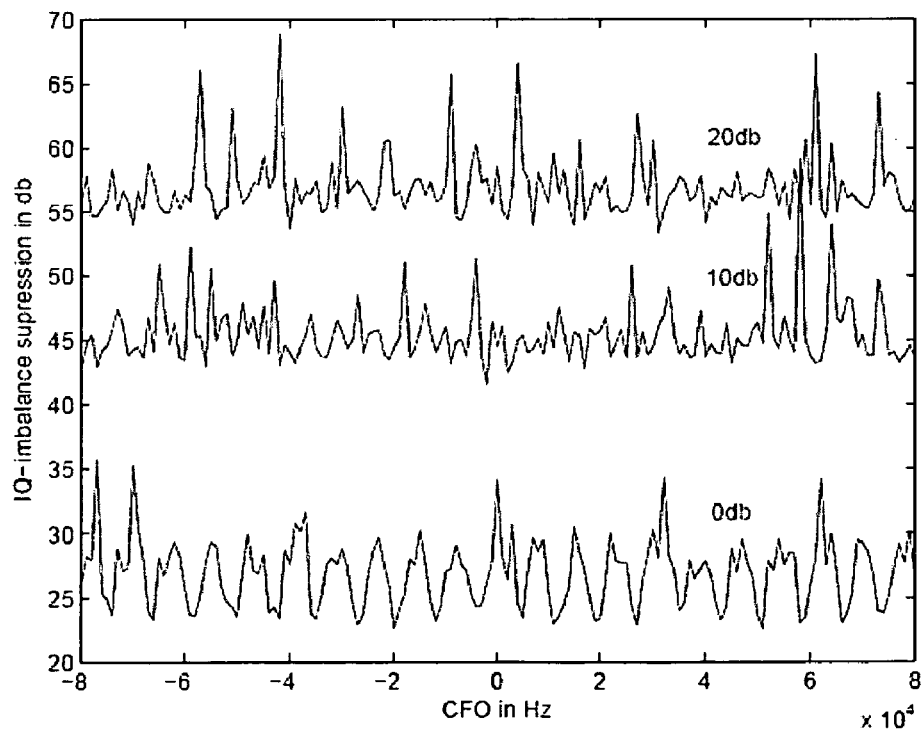
FIG. 10 shows the average IQ-imbalance suppression error (related in db to the signal without IQ-imbalance) in function of the CFO and for SNRs of 0 db, 10 db and 20 db.

To test the performance of the proposed IQ-imbalance estimation method, a series of simulations was made with a QAM64 data stream with the above defined system parameters. Each time, a CFO and IQ-imbalance estimate has been made and the IQ-imbalance compensation has been applied. The IQ compensated data stream has then been subtracted from the received data stream, at the stage in the receiver, where noise and CFO have been applied, but before application of IQ-imbalance. The residual error is a measure for the remaining non-compensated IQ-imbalance. In FIG. 10 a plot is shown of the average IQ-imbalance suppression error (related in db to the signal without IQ-imbalance) in function of the CFO and for SNRs of 0 db, 10 db and 20 db. The obtained suppression depends on the CFO but does not drop below a certain floor which depends on the SNR.

The above presented techniques can be used amongst others in High Rate High Mobility applications as described in EP 05447109 and in systems as described in U.S. Ser. No. 10/134,307, EP 03447096, which are hereby incorporated by reference.

The above presented techniques can furthermore be used in combination with the techniques disclosed in EP 1506654, which is hereby incorporated by reference.

For receivers for which the carrier frequency can be programmed, the artificial CFO can also be applied at the receiver. This is for example the case for receivers where the carrier frequency is generated by a digitally programmable PLL. For receivers with a programmable carrier frequency, a variation of the CFO estimation method above can be used to estimate the CFO.

The CFO measurement is done on 2 consecutive received bursts, each containing a preamble. On the preamble of the first burst an estimate of cos (is made using (eq. 15):

$$\cos\varphi = \frac{\Re \sum_{k=1}^{l} y_1(k) y_2^*(k) + y_3(k) y_2^*(k)}{2 \sum_{k=1}^{l} |y_2(k)|^2} \quad (15)$$

where $y_x(k)$ with x=1, 2, 3 and k=1 ... l are the samples of the preamble of the first burst and $$\varphi = 2\pi \frac{CFO}{f_s} l$$

is the angle rotation caused by the CFO over a distance l.

Between the first and second burst, the carrier frequency $f_c$ of the receiver is re-programmed to get as close as possible to $f_c$+ACFO, where according to (eq. 20)

$$ACFO = \frac{f_s}{4l}.$$

In practice the carrier frequency will only be programmable infinite digital steps and the new receiver carrier frequency will become $f_c$+ACFO+$\Delta f$, where $\Delta f$ is a known error originating from the discrete steps in which the receiver carrier frequency can be programmed. Because the artificial CFO is applied by a shift in receiver carrier frequency, the artificial CFO shift will occur in the receiver at the stage of the mixer before IQ imbalance is introduced. This makes the artificial CFO shift at the receiver, by changing the receiver carrier frequency, for all practical purposes equivalent to an artificial CFO shift at the transmitter.

With this new receive carrier frequency a CFO estimation is done on the preamble of the second burst. This is done again by making an estimation of the cosine of the angle rotation caused by the combined CFOs:

$$\cos\rho = \frac{\Re \sum_{k=1}^{l} z_1(k) z_2^*(k) + z_3(k) z_2^*(k)}{2 \sum_{k=1}^{l} |z_2(k)|^2} \quad (54)$$

where $z_x(k)$ with x=1, 2, 3 and k=1 ... l are the samples of the preamble of the second burst and the angle $$\rho = 2\pi \frac{CFO + ACFO + \Delta f}{f_s} l \quad (55)$$

$$\Delta\varphi = 2\pi \frac{\Delta f}{f_s} l \quad (56)$$

the cosine of the angle rotation can be expressed as:

$$\cos\rho = \cos\left(2\pi \frac{CFO + ACFO + \Delta f}{f_s} l\right) \quad (57)$$
$$= \cos\left(\varphi + \Delta\varphi + \frac{\pi}{2}\right)$$
$$= -\sin(\varphi + \Delta\varphi)$$

By applying the trigonometric addition formula on $\sin((\phi+\Delta\phi)$ and performing some algebraic manipulations, one can obtain an estimate for:

$$\tan\varphi = \frac{\sin(\varphi + \Delta\varphi)}{\cos\varphi \cos\Delta\varphi} - \tan\Delta\varphi \quad (58)$$

In the above equation $\Delta\phi$ is known because $\Delta f$ is known and $\cos\phi$ was previously estimated on the first burst. With the estimate of $\cos\phi$ and $\tan\phi$ an estimate of the CFO can be made:

$$\cos\varphi \geq 0, \; CFO = \frac{f_s}{2\pi l} \tan^{-1}(\tan\varphi) \quad (59)$$

$$\cos\varphi < 0, \; CFO = \frac{f_s}{2\pi l} \tan^{-1}(\tan\varphi) + \text{sign}(\tan\varphi)\pi \quad (60)$$

Applying the artificial CFO at the receiver makes the above described CFO estimation method suited for a wider range of applications and standards. The only requirement at the transmitter is the presence of a 3-fold repetitive sequence on the preamble. Contrary to the first described CFO estimation method, there is no more need for a second 3-fold repetitive sequence with super-imposed artificial CFO at the transmitter.

Figure 11:
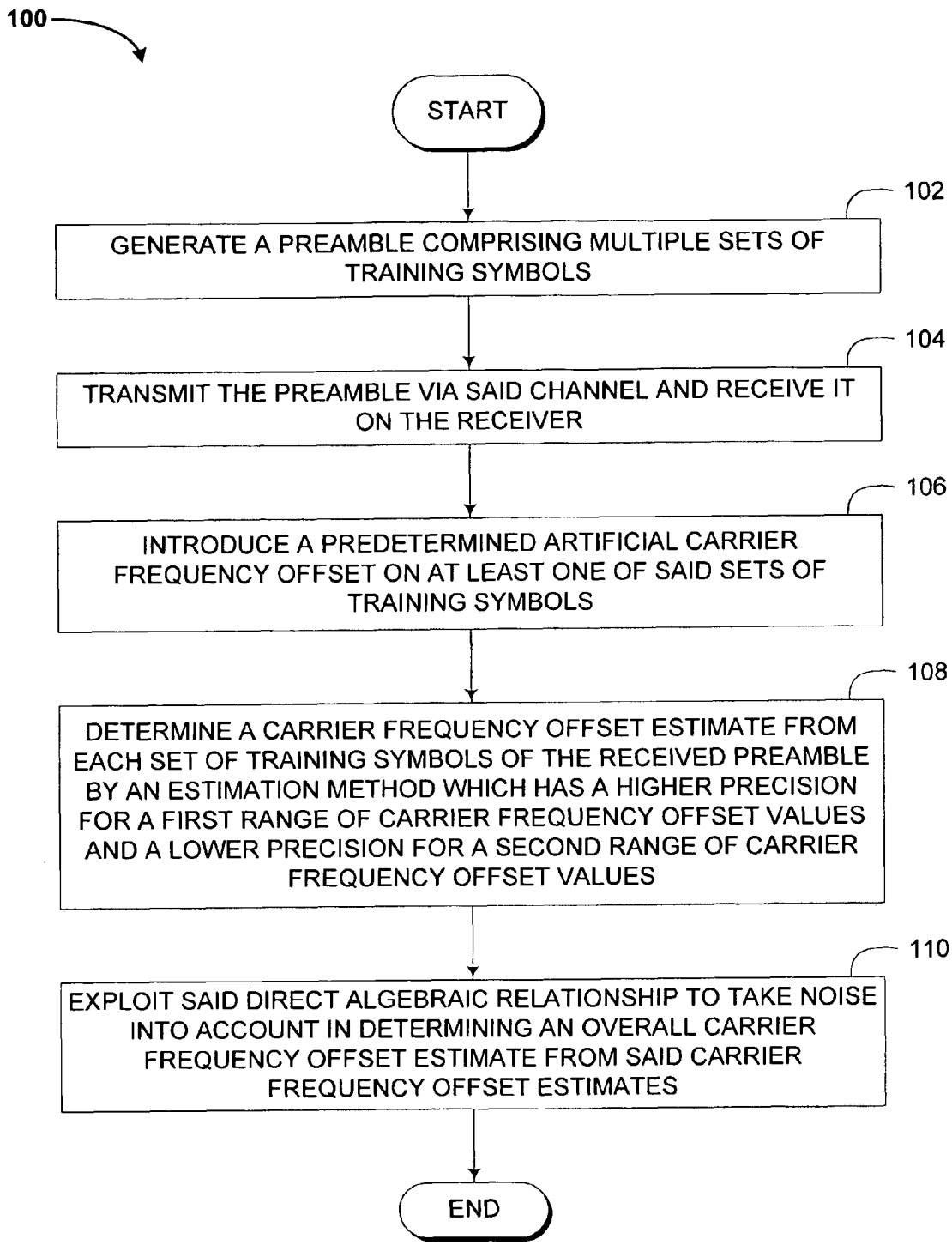
FIG. 11 shows a flowchart of one embodiment of a method of estimating carrier frequency offset.

FIG. 11 shows a flowchart of one embodiment of a method of estimating carrier frequency offset introduced on an RF multicarrier signal received via a transmission channel on a direct downconversion analog receiver. The method 100 starts at a block 102, wherein a preamble comprising multiple sets of training symbols is generated. Next at a block 104, the preamble is transmitted via the channel and received on the receiver. Moving to a block 106, a predetermined artificial carrier frequency offset is introduced on at least one of the sets of training symbols. Next at a block 108, a carrier frequency offset estimate is determined from each set of training symbols of the received preamble by an estimation method which has a higher precision for a first range of carrier frequency offset values and a lower precision for a second range of carrier frequency offset values. In one embodiment, each of the carrier frequency offset estimates is determined by a direct algebraic relationship between a number of the training symbols of the considered set. The direct algebraic relationship cancels out IQ imbalance. Moving to a block 110, the direct algebraic relationship is exploited to take noise into account in determining an overall carrier frequency offset estimate from the carrier frequency offset estimates.

In one embodiment, the predetermined artificial carrier frequency offset is chosen for shifting the carrier frequency offset of that set of training symbols of the preamble generated in block 204 to the first range of carrier frequency offset values.

Figure 12:
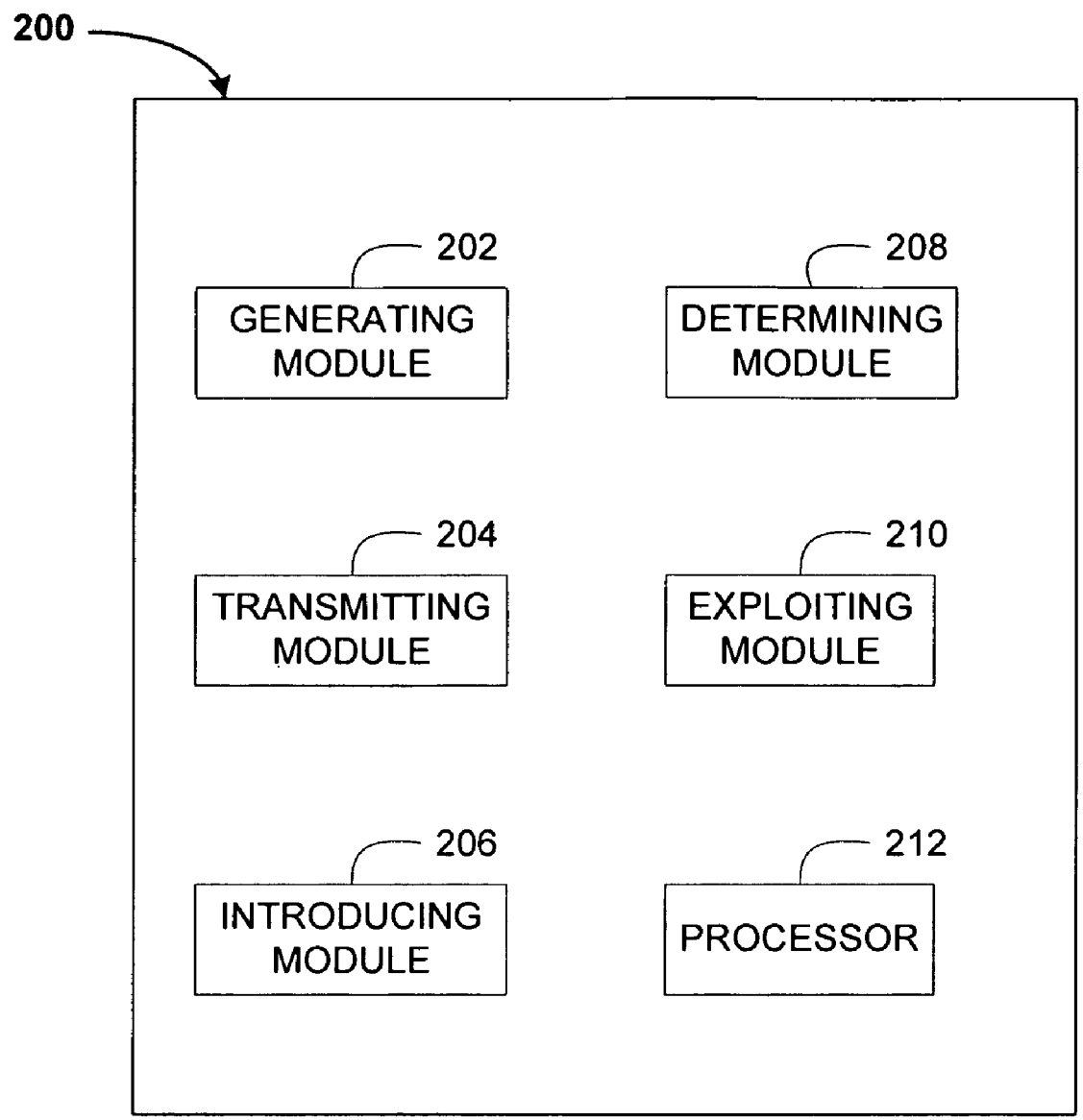
FIG. 12 shows a block diagram illustrating one embodiment of a system configured to estimate carrier frequency offset.

FIG. 12 shows a block diagram illustrating one embodiment of a system configured to estimate carrier frequency offset introduced on an RF multicarrier signal received via a transmission channel on a direct downconversion analog receiver. The system 200 may comprise a generating module 202 configured to generate a preamble comprising multiple sets of training symbols. The system 200 may further comprise a transmitting module 204 configured to transmit the preamble via the channel and receiving it on the receiver. The system 200 may further comprise an introducing module 206 configured to introduce a predetermined artificial carrier frequency offset on at least one of the sets of training symbols. The system 200 may further comprise a determining module 208 configured to determine a carrier frequency offset estimate from each set of training symbols of the received preamble by an estimation method which has a higher precision for a first range of carrier frequency offset values and a lower precision for a second range of carrier frequency offset values, wherein each of the carrier frequency offset estimates is determined by a direct algebraic relationship between a number of the training symbols of the considered set. The direct algebraic relationship cancels out IQ imbalance. The system may further comprise an exploiting module 210 configured to exploit the direct algebraic relationship to take noise into account in determining an overall carrier frequency offset estimate from the carrier frequency offset estimates. The system may further comprise a processor 212. In some embodiments, the predetermined artificial carrier frequency offset is chosen for shifting the carrier frequency offset of that set of training symbols of the generated preamble to the first range of carrier frequency offset values.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of estimating carrier frequency offset introduced on an RF multicarrier signal received via a transmission channel on a direct downconversion analog receiver, comprising:
   a) generating a preamble comprising multiple sets of training symbols,
   b) transmitting the preamble via the channel and receiving it on the receiver,
   c) introducing a predetermined artificial carrier frequency offset on at least one of the sets of training symbols,
   d) determining a carrier frequency offset estimate from each set of training symbols of the received preamble by an estimation method which has a higher precision for a first range of carrier frequency offset values and a lower precision for a second range of carrier frequency offset values, wherein each of the carrier frequency offset estimates is determined by a direct algebraic relationship between a number of the training symbols of the considered set, the direct algebraic relationship cancelling out IQ imbalance; and e) exploiting the direct algebraic relationship to take noise into account in determining an overall carrier frequency offset estimate from the carrier frequency offset estimates;

wherein the predetermined artificial carrier frequency offset is chosen for shifting the carrier frequency offset of that set of training symbols of the generated preamble to the first range of carrier frequency offset values, wherein the carrier frequency offset is modelled as a phase rotation and that the determining of a carrier frequency offset estimate comprises determining a phase rotation for each received set of training symbols by the direct algebraic relationship, wherein the direct algebraic relationship for determining the phase rotation for each received set of training symbols is based at least in part on the following equation:

$$\frac{y(k) + y(k+2l)}{y(k+l)} = 2\cos\varphi$$

wherein $y(k)$, $y(k+l)$ and $y(k+2l)$ are three equal training symbols of the respective set of the received preamble, spaced by a delay l in time, and wherein $\varphi$ is the phase rotation between these training symbols.

2. The method according to claim 1, wherein each of the multiple sets of training symbols comprises at least three equal training symbols at the same delay from each other.

3. The method according to claim 1, wherein noise is taken into account by taking a weighted average of the multiple estimates, by introducing weights which are chosen inversely proportional with a variance of the estimations into the direct algebraic relationship, thereby obtaining the overall carrier frequency offset estimate.

4. The method according to claim 1, wherein the average carrier frequency offset estimate is determined based at least in part on by the following equation, which forms the direct algebraic relationship including the weights:

$$\cos\varphi = \frac{\Re\sum_{k=1}^{l} y(k)y^*(k+l) + y(k+2l)y^*(k+l)}{2\sum_{k=1}^{l}|y(k+l)|^2}$$

wherein $\cos\varphi$ is the overall carrier frequency offset estimate.

5. The method according to claim 1, wherein the preamble generated comprises a first and a second set of training symbols, the training symbols of the first set being substantially the same as those of the second set, and that the introducing of a predetermined artificial carrier frequency offset comprises introducing a first predetermined artificial carrier frequency offset on the first set and a second predetermined artificial carrier frequency offset on the second set, the first and second predetermined artificial carrier frequency offsets differing from each other in such a way that the carrier frequency offset of at least one of the first and second sets of training symbols of the preamble received is shifted to the first range.

6. The method according to claim 5, wherein the first and second predetermined artificial carrier frequency offsets are respectively chosen such that they cause the respective phase rotations between training symbols in the first and second set to be $\phi_1$ and $\phi_2 = \phi_1 + \pi/2$ + a multiple of $2\pi$ respectively.

7. The method according to claim 6, wherein the overall carrier frequency offset estimate is determined using the following equations:

$$\cos\varphi = \frac{\Re\sum_{k=1}^{l} y_1(k)y_2^*(k) + y_3(k)y_2^*(k)}{2\sum_{k=1}^{l}|y_2(k)|^2}$$

$$\sin\varphi = -\frac{\Re\sum_{k=1}^{l} z_1(k)z_2^*(k) + z_3(k)z_2^*(k)}{2\sum_{k=1}^{l}|z_2(k)|^2}$$

wherein $y_x(k)$ for $x=1, 2, 3$ and $k=1:l$ are the training symbols of the first set of the received preamble;

$z_x(k)$ for $x=1, 2, 3$ and $k=1:l$, are the training symbols of the second set of the received preamble;

l is the regular delay between two successive equal training symbols upon generation of the preamble;

$\varphi$ is the phase rotation between the training symbols.

8. The method according to claim 7, wherein the carrier frequency offset estimate is determined as follows:

$$\text{for } \cos\varphi \geq 0,\ CFO = \frac{f_s}{2\pi l}\tan^{-1}\left(\frac{\sin\varphi}{\cos\varphi}\right)$$

$$\text{for } \cos\varphi < 0,\ CFO = \frac{f_s}{2\pi l}\left[\tan^{-1}\left(\frac{\sin\varphi}{\cos\varphi}\right) + \text{sign}(\sin\varphi)\pi\right]$$

wherein

CFO is the carrier frequency offset estimate and $f_s$ is the frequency of the training symbols in the preamble.

9. The method according to claim 1, further comprising:

determining a noise power of the received preamble; and determining an overall carrier frequency offset estimate using a maximum likelihood carrier frequency offset estimation method if the noise power is below a given threshold instead of performing the process described above in (d) and (e).

10. The method according to claim 1, wherein the introducing of a predetermined artificial carrier frequency offset is performed upon the generating of the preamble.

11. The method according to claim 1, wherein the introducing of a predetermined artificial carrier frequency offset is performed after the receiving of the preamble.

12. A method of compensating carrier frequency offset introduced on an RF multicarrier signal received via a transmission channel on a direct conversion analog receiver, comprising:

estimating the carrier frequency offset by a method, the method comprising:

a) generating a preamble comprising multiple sets of training symbols, b) transmitting the preamble via the channel and receiving it on the receiver, c) introducing a predetermined artificial carrier frequency offset on at least one of the sets of training symbols, d) determining a carrier frequency offset estimate from each set of training symbols of the received preamble by an estimation method which has a higher precision for a first range of carrier frequency offset values and a lower precision for a second range of carrier frequency offset values, wherein each of the carrier frequency offset estimates is determined by a direct algebraic relationship between a number of the training symbols of the considered set, the direct algebraic relationship cancelling out IQ imbalance; and e) exploiting the direct algebraic relationship to take noise into account in determining an overall carrier frequency offset estimate from the carrier frequency offset estimates;

wherein the predetermined artificial carrier frequency offset is chosen for shifting the carrier frequency offset of that set of training symbols of the generated preamble to the first range of carrier frequency offset values, wherein the carrier frequency offset is modelled as a phase rotation and that the determining of a carrier frequency offset estimate comprises determining a phase rotation for each received set of training symbols by the direct algebraic relationship, wherein the direct algebraic relationship for determining the phase rotation for each received set of training symbols is based at least in part on the following equation:

$$\frac{y(k) + y(k+2l)}{y(k+l)} = 2\cos\varphi$$

wherein y(k), y(k+l) and y(k+2l) are three equal training symbols of the respective set of the received preamble, spaced by a delay l in time, and wherein φ is the phase rotation between these training symbols; and compensating the received RF signal for carrier frequency offset by the estimated carrier frequency offset.

13. The method according to claim 12, further comprising determining IQ imbalance parameters from the received preamble.

14. The method according to claim 13, further comprising compensating the received RF signal for IQ imbalance by the IQ imbalance parameters.

15. A system configured to estimate carrier frequency offset introduced on an RF multicarrier signal received via a transmission channel on a direct downconversion analog receiver, comprising:

means for generating a preamble comprising multiple sets of training symbols, means for transmitting the preamble via the channel and receiving it on the receiver, means for introducing a predetermined artificial carrier frequency offset on at least one of the sets of training symbols, means for determining a carrier frequency offset estimate from each set of training symbols of the received preamble by an estimation method which has a higher precision for a first range of carrier frequency offset values and a lower precision for a second range of carrier frequency offset values, wherein each of the carrier frequency offset estimates is determined by a direct algebraic relationship between a number of the training symbols of the considered set, the direct algebraic relationship cancelling out IQ imbalance; and means for exploiting the direct algebraic relationship to take noise into account in determining an overall carrier frequency offset estimate from the carrier frequency offset estimates;

wherein the predetermined artificial carrier frequency offset is chosen for shifting the carrier frequency offset of that set of training symbols of the generated preamble to the first range of carrier frequency offset values, wherein the carrier frequency offset is modelled as a phase rotation and that the determining of a carrier frequency offset estimate comprises determining a phase rotation for each received set of training symbols by the direct algebraic relationship, wherein the direct algebraic relationship for determining the phase rotation for each received set of training symbols is based at least in part on the following equation:

$$\frac{y(k) + y(k+2l)}{y(k+l)} = 2\cos\varphi$$

wherein y(k), y(k+l) and y(k+2l) are three equal training symbols of the respective set of the received preamble, spaced by a delay l in time, and wherein φ is the phase rotation between these training symbols.

16. A system configured to estimate carrier frequency offset introduced on an RF multicarrier signal received via a transmission channel on a direct downconversion analog receiver, comprising:

a generating module configured to generate a preamble comprising multiple sets of training symbols, a transmitting module configured to transmit the preamble via the channel and receiving it on the receiver, an introducing module configured to introduce a predetermined artificial carrier frequency offset on at least one of the sets of training symbols, a determining module configured to determine a carrier frequency offset estimate from each set of training symbols of the received preamble by an estimation method which has a higher precision for a first range of carrier frequency offset values and a lower precision for a second range of carrier frequency offset values, wherein each of the carrier frequency offset estimates is determined by a direct algebraic relationship between a number of the training symbols of the considered set, the direct algebraic relationship cancelling out IQ imbalance; and an exploiting module configured to exploit the direct algebraic relationship to take noise into account in determining an overall carrier frequency offset estimate from the carrier frequency offset estimates;

wherein the predetermined artificial carrier frequency offset is chosen for shifting the carrier frequency offset of that set of training symbols of the generated preamble to the first range of carrier frequency offset values, wherein the carrier frequency offset is modelled as a phase rotation and that the determining of a carrier frequency offset estimate comprises determining a phase rotation for each received set of training symbols by the direct algebraic relationship, wherein the direct algebraic relationship for determining the phase rotation for each received set of training symbols is based at least in part on the following equation:

$$\frac{y(k)+y(k+2l)}{y(k+l)} = 2\cos\varphi$$

wherein $y(k)$, $y(k+l)$ and $y(k+2l)$ are three equal training symbols of the respective set of the received preamble, spaced by a delay l in time, and wherein $\varphi$ is the phase rotation between these training symbols.

* * * * *